March 19, 1968    C. W. LARKAM ET AL    3,374,403
SOLION POLARIZED CATHODE ACOUSTIC LINEAR TRANSDUCER
Filed June 30, 1965

INVENTORS
CHARLES W. LARKAM
GAYLE E. ENGLISH
BERT R. HAMMER
EDWIN H. BLOCK
JOSEPH L. COLLINS by *Richard J. Miller*

ATTY.

United States Patent Office 3,374,403
Patented Mar. 19, 1968

3,374,403
SOLION POLARIZED CATHODE ACOUSTIC LINEAR TRANSDUCER
Charles W. Larkam, Gayle E. English, Bert R. Hammer, Edwin H. Block, and Joseph L. Collins, Austin, Tex., assignors, by mesne assignments, to the United States of America as represented by the Secretary of the Navy
Filed June 30, 1965, Ser. No. 468,650
7 Claims. (Cl. 317—231)

ABSTRACT OF THE DISCLOSURE

An improved solion transducer is described having first and second spaced cathodes, first and second spaced anodes and individual flow distribution plates spaced between the cathode and anode. The entire set of plates being substantially parallel to each other and centered along a longitudinal axis of the solion housing.

This invention relates to an improved transducer and more specifically to an improved solion transducer wherein electrolytic solution, by its motion, generates an electrical signal in an external circuit.

In the past, many attempts have been made to construct transducers having a linear response utilizing the electrolytic flow process. Many of these fail to meet the constant pressure sensitivity conditions for various reasons. A common cause for failure is the use of a single cathode orifice having an area which was large compared to the cross-section for diffusion in the cavity ahead of the cathode orifice so that there is not a plane of constant electrolytic composition near the cathode. Other causes for failure to produce linear output are excessive spacings between elements or unequal distance between elements, or excessive flow paths parallel to cathode surfaces. Generally, most of the previously produced solion were not reproducible in the quantity due to the lack of understanding of the parameters and conditions necessary to produce successfully linear device.

Therefore, it is an object of this invention to provide an improved solion having constant pressure sensitivity and flat frequency response in the infrasonic region.

It is a further object of this invention to provide a solion with high power gain.

It is yet another object of this invention to provide a solion particularly adapted to coupling to transistors circuitry.

Yet still another object of this invention is to provide a solion operable with long leads and without extensive auxiliary electronic equipment.

Another object of this invention is to provide a stable zero solion having a low acoustic pressure threshold.

Still a further object of this invention is to provide a solion with increased ability to measure small pressure differences when exposed to high absolute pressures.

An it is yet still further an object of this invention to provide a solion having no mechanical moving parts.

Yet it is still a further object of this invention to provide an improved solion comprising; a housing having an aperture therethrough, first and second flexible diaphragms closing said aperture, first and second cathodes disposed across said aperture, first and second anodes disposed across said aperture between said cathodes and said diaphragms, first and second flow distribution means in juxtaposition to said cathodes on the anode side thereof, and an electrolytic means filling said aperture flowable under deformation of said diaphragms to generate electrical current in an external circuit coupled to said anode and cathodes.

Figure 2:
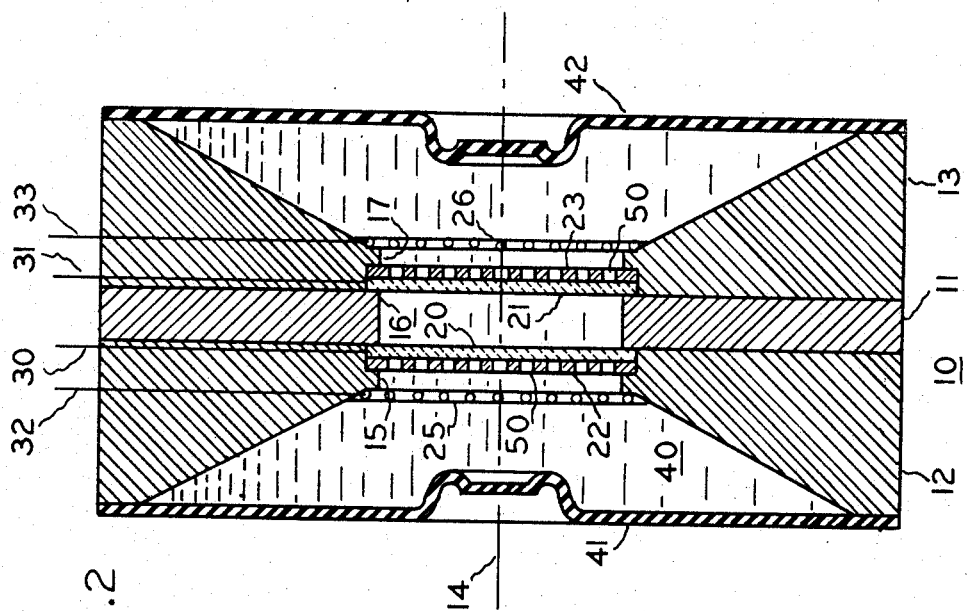
Figure 3:
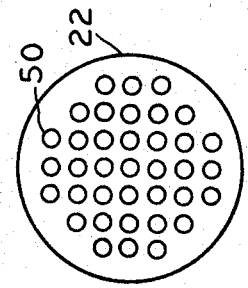
Figure 1:
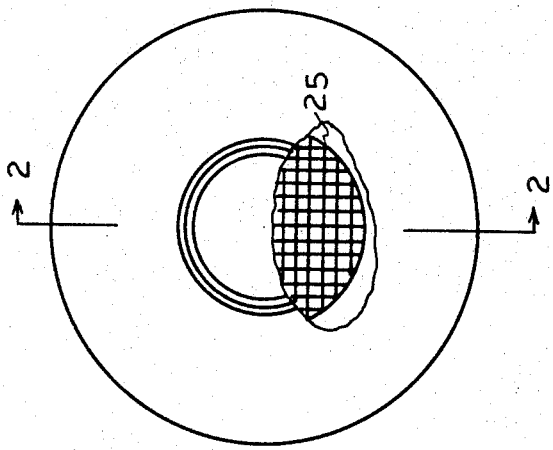

Other objects, advantages and novel features of the invention will become apparent from the following detailed description of the invention when considered in conjunction with the accompanying drawings wherein:

FIGURE 1 is a view of a solion;
FIGURE 2 is a sectional view along lines 2—2 in FIGURE 1; and
FIGURE 3 is a detailed view of a portion of the device of FIGURE 1.

The solion as shown in the various figures includes a housing portion generally designated by the number 10, which includes an annular member 11, and two tapered annular members 12 and 13. Members 11, 12, and 13 are all disposed about a common longitudinal axis 14 and each contains an annular, centrally disposed portion numbered 15, 16, and 17. The net effect of this construction is to provide an aperture through the housing 10 which has a portion 15, 16, 17 of reduced cross-sectional area or a stricture.

A pair of sintered platinum disks 20, 21, are disposed adjacent the aperture 16 in member 11. The disks are substantially parallel with respect to each other and normal to the axis 14 in this embodiment of the invention, and in effect have a cross-sectional area approximately equal to the reduced portion of the aperture through housing 10. In juxtaposition with the disks 20 and 21 are a pair of flow dispersion plates 22, 23 whose function becomes apparent hereinafter. A first grid 25 is spaced from plate 22, and a second grid 26 is spaced from plate 23. It should be pointed out that the grids 25 and 26 are substantially parallel to each other and normal to the axis 14 hence parallel to the disks 20 and 21, and have a cross-sectional area approximately equal to the stricture in the aperture extending through housing 10. Leads 30 and 31 are connected respectively with disks 20 and 21, and leads 32 and 33 are connected respectively with the grids 25, 26. These are provided to properly bias the solion for operation. External circuitry is provided (not shown) coupled to leads 30, 31, 32, and 33 to bias the grids 25, 26 with respect to disks 20, 21. Depending upon the selected electrolyte they may be biased positive or negatively.

For the sake of this disclosure it is assumed that the plates 25, 26 are biased positively and serve as anodes while the disks 20, 21 are biased negatively and serve as cathodes. An electrolyte 40 is provided in the aperture extending through housing 10 and it is confined therein by a pair of flexible diaphragms 41, 42. Thus, it is possible to immerse the solion in water or other fluids and the pressures encountered at operating depths are counteracted by the entire device being filled with liquid and hence it adjusts itself to whatever the pressure is in its operating environ.

The grids 25, 26, as shown, are substantially a rectangular mesh which permits the free-flow therethrough of the electrolytic solution. The baffle plates 22 and 23 are shown in more detail in FIGURE 3, and it is to be noted that they contain a plurality of holes 50, which permits the electrolyte to flow through the plates and further serves to direct the pattern of flow or the liquid through the sintered platinum disks 20, 21. These have a substantially porous construction and therefore, although somewhat limiting the flow of liquid therethrough, the plates do permit such flow and the solion may operate as it is designed to operate. The structure as shown in the centrally disposed aperture of the housing members is particularly designed to improve the linear characteristic of the solion.

In one successful embodiment of the invention the material used for the plates 22, 23 was tantalum, which is particularly adapted for such use because of its chemical properties.

The operation of this device with potassium iodide as an electrolyte is as follows. The construction is such that a minute linear displacement of the input diaphragms results in a highly magnified displacement of the fluid across the cathodes. To the extent that $I_2$ is available at a cathode surface, electrons entering the cell through a cathode lead can be accommodated by the reaction $$I_2 + 2e^- \rightarrow 2I^- \tag{1}$$

Simultaneously, electrons are furnished to the external circuit and $I_2$ is regenerated at the anode by the reaction $$2I^- \rightarrow I_2 + 2e^- \tag{2}$$

The potassium iodide in the electrolyte is wholly ionized, providing an abundant supply of $K^+$ and $I^-$ ions. This high concentration of ions makes the bulk electrolyte a relatively good electrical conductor, and the voltage drop accompanying the low electrical current normally flowing across it is correspondingly very small. The concentration of $I_2$ in the bulk solution is much lower than that of $I^-$, and the potential at each cathode is maintained sufficiently negative to make its surface virtually a perfect sink for $I_2$. For this purpose, the bias should be not less than 150 mv.; bias in excess of 900 mv. causes irreversible changes within the transducer. Essentially the entire potential drop across a pair of electrodes occurs at the cathode surface. This potential obviously cannot be responsible for accelerating uncharged $I_2$ toward the cathode. For purposes of the present analysis, the external current is assumed to be directly proportional to the rate at which $I_2$ is transported from anode to cathode by the combined action of forced convection and molecular diffusion.

On the macroscopic scale we regard the sintered cathode as porous, like a woven gauze or felted mat of metal fibers, and we speak of the flow of electrolyte through it. Thus matter in solution can be transported most of the way from anode to cathode by convection. But since the liquid velocity can have no component normal to the surface at the actual metal-solution interface, the final stage of an $I_2$ molecule's journey must be made solely by diffusion. For the time being, we shall assume that the cathode pores are so fine that all electrolyte swept in past the front surface of the cathode is instantly and completely stripped of iodine by reaction (1).

The concentration, $y$, of limiting charge carrier $I_2$ at any point in the electrolyte is conveniently expressed in units of coulombs of charge accepting capacity per cubic centimeter. Then a first approximation, which becomes increasingly valid as the flow rate is increased, the downstream current is negligible, and the current from the upstream cathode is related to the volumetric flow rate and the bulk electrolyte concentration by the equation $$i_f = y_0 v \tag{3}$$

The flow rate is $$v = P/Z \tag{4}$$

where $P$ is the signal pressure and $Z$ is the acoustic impedance. If this equation is combined with the preceding one and the result is applied to the difference in the output currents of the two cathodes, $$I = y_0 P/Z \tag{5}$$

Qualitatively, at least, the errors resulting from neglect of the contribution of the downstream cathode, and of the fact that the effective concentration at the upstream cathode is less than $y_0$, tend to be mutually compensating. An actual waveform analysis shows negligible distortion in the output response of a particular solion transducer to a particular sinusoidal input pressure signal. Accordingly, Equation 5 is accepted as the basic expression of the transfer function.

The quantity $Z$ appearing in Equation 5 is complex, since it involves the capacitive reactance of the diaphragms and the inertance of flow in cathode openings as well as the resistive component associated with fluid friction. Actually, these transducers normally have such low cathode permeability that the inductive component of $Z$ is negligible at frequencies within the normal operating range. Diaphragm reactance does give rise to the low frequency limitation on response, but has been considered negligible over the upper part of the normal frequency range. The low frequency 3-db down period is simply $$T = R_{ac} C_{ac} \tag{6}$$

where $R_{ac}$ is the flow resistance of the two cathodes in series and $C_{ac}$ is the compliance of the diaphragm pair.

To the extent Equation 5 is valid and $Z$ is purely resistive, the output power for a given sound pressure remains constant as the frequency is decreased. This characteristic, together with a power gain of the order of one million, is accomplished with no more auxiliary electrical equipment than a small battery. The sensitivity and zero point are stable and the transducer can be separated from its power supply and load by thousands of feet of cable.

It can be shown that an improved solion transducer can be produced if the cathodes and anodes belonging to a given half-cell are segments of concentric cylinders or spheres and if the fluid flow lines are radial. It is apparent from the drawing that two half-cell devices are provided and are in effect back-to-back. Additionally, the various elements are constructed in the preferred embodiment so that they are plane parallel. That is, anode 25, plate 22 and cathode 20 are all parallel to each other, and similarly cathode 21, plate 23 and anode 26 are coplanar.

In addition, the cross-sectional area of the anodes, cathodes and flow dispersion plates have substantially the same cross-sectional area and thus the flow of the electrolyte past each is approximately equal.

The linearity of the solion transducer comes from the fact that at the low flow density and velocity operating points at which nonlinear output can occur, output from the two cells back-to-back when added is linear.

Obviously many modifications and variations of the present invention are possible in the light of the above teachings. It is therefore to be understood that within the scope of the appended claims the invention may be practiced otherwise than as specifically described.

We claim:
1. An improved solion transducer comprising:
   (a) a housing having an aperture extending therethrough;
   (b) first and second flexible diaphragms closing opposite ends of said aperture;
   (c) first and second porous cathodes spaced apart within said aperture;
   (d) first and second anodes in said aperture between said cathodes and diaphragms, respectively;
   (e) means including an electrolyte filling said aperture flowable through said anodes and said cathodes for generating electrical signals utilizable in an external circuit; and
   (f) first and second means across said aperture between said anodes and cathodes respectively for providing uniform flow distribution of said electrolyte through a plane transverse to the axis of said aperture.
2. The improved transducer of claim 1 wherein said first and second transducer, first and second porous cathodes, first and second anodes, and said first and second means are substantially normal to a longitudinal axis of said housing.
3. The improved transducer of claim 2 wherein there is provided means for biasing the anode positive with respect to the cathode.
4. The improved transducer of claim 3 wherein said cathodes are composed of sintered platinum.
5. The improved transducer of claim 4 wherein said first and second means across said aperture are made of tantalum and have a plurality of small holes extending therethrough.

6. The improved transducer of claim 5 wherein said electrolyte is potassium iodide.

7. The improved transducer of claim 6 wherein said first and second means provides uniform flow distribution and are positioned in juxtaposition with said cathodes respectively and spaced from said anodes.

References Cited

UNITED STATES PATENTS

| 3,143,691 | 8/1964 | Hurd | 317—231 |
| 3,157,832 | 11/1964 | Hurd | 317—231 |
| 3,163,806 | 12/1964 | Estes et al. | 317—231 |
| 3,295,028 | 12/1966 | Argue et al. | 317—231 |

JAMES D. KALLAM, *Primary Examiner.*